United States Patent [19]
Ellis

[11] Patent Number: 4,795,481
[45] Date of Patent: Jan. 3, 1989

[54] AIR FILTER WITH HIGH DUST-HOLDING CAPACITY

[75] Inventor: Jerry R. Ellis, Visalia, Calif.

[73] Assignee: Cambridge Filter Corporation, Syracuse, N.Y.

[21] Appl. No.: 173,567

[22] Filed: Mar. 25, 1988

[51] Int. Cl.$^4$ .......................................... B01D 46/12
[52] U.S. Cl. ........................................ 55/500; 55/521
[58] Field of Search ......................... 55/497, 500, 521

[56] References Cited

U.S. PATENT DOCUMENTS 3,807,150  4/1974  Maracle ........................... 55/521 X
4,619,676  10/1986  Tuyck .................................... 55/500

Primary Examiner—Charles Hart
Attorney, Agent, or Firm—Charles S. McGuire

[57] ABSTRACT

An air filter of the accordion-pleated type with successive media pleats providing substantially parallel walls held in spaced relation by corrugated spaces and sealed within a square or rectangular frame. The spacers which separate the media in the upstream direction are of higher amplitude than the spacers separating the media walls on the downstream side. The upstream spacers are preferably about 2 to 2½ times greater in amplitude than the downstream spacers. The filters are particularly advantageous in applications where the loading or dust collection rate is accelerated and the final pressure drop is uncommonly high. Dust holding capacity is significantly increased over similar, prior art filters having equal spacing of the media walls in the upstream and downstream directors.

5 Claims, 1 Drawing Sheet

AIR FILTER WITH HIGH DUST-HOLDING CAPACITY

BACKGROUND OF THE INVENTION

The present invention relates to air filters of the type having a continuous sheet of media folded in zig-zag or accordion fashion to provide a succession of substantially parallel media walls held in spaced relation by corrugaed spacers. More specifically, the invention relates to a pleated media air filter mounted in a square or rectangular frame for use in high dust loading applications.

Typical HEPA filter packs of rectangular configuration employ a continuous sheet of fiberglass, or other media, folded in transverse pleats held in spaced relation on both sides, i.e., in upstream and downstream directions, by identical spacer elements typically of corrugated aluminum. The height of the corrugations defines the amplitude of the spacers which, in turn, determines the lateral spacing of the adjacent media walls.

In conventional HVAC applications for HEPA filters, the final pressure drop is normally established at 2 inchest w.g. for filters with initial resistance of 1 inch w.g. at rated capacity. In non-HVAC applications involving unusually high dust loading, e.g., when installed in negative air machines on asbestos abatement job sites, HEPA filters are commonly operated to a final pressure drop of 3.5 inches w.g. or higher. Furthermore, it is common in such applications for the filters to be loaded to the final pressure drop of 3.5 inches w.g. within a few hundred hours of operation as compared to a final pressure drop of approximately 2 inches w.g. in many thousands of hours in typical HVAC applications. Thus, not only is the dust loading much greater, it is also vastly more accelerated.

It is a principal object of the present invention to provide a HEPA-type filter pack having superior dust-holding capacity.

A further object is to provide an air filter pack of accordion-pleated media in a rectangular frame which has superior operating charcteristics under conditions of accelerated loading.

Another object is to provide a novel and improved high efficiency air filter particularly suited for us in non-HVAC applications involving dust loading to relatively high final pressure drop.

Other objects will in part be obvious and will in part appear hereinafter.

SUMMARY OF THE INVENITON

In accordance with the foregoing objects, the invention contemplates an air filter pack having a continuous sheet of media folded in successive pleats to form adjacent walls which are substantially parallel. Corrugated apacers are placed between each pair of adjacent walls to maintain a desired spacing both on the upstream and downstream sides. The folded sheet of media is mounted within an open, square or rectangular frame which is positioned in an opening through which the air to be filtered passes. The media is suitably sealed to the frame, and the frame to the supporting structure, so that all air must pass through the media with airborne particles collecting on the upstream side of the media.

In contrast to prior HEPA-type rectangular frame filters, the spacers which are positioned between media pleats or walls facing in the upstream direction have a height of amplitude greater than that of the downstream spacers. The media is folded in a complementary fashion to accept the spacers of alternating high and low amplitude, i.e., with square folds or "knuckles" at one end wider than those at the opposite end.

As will appear in greater detail hereinafter, it has been found that a filter pack of such configuration provides the aforementioned advantages of higher dust-holding capacity, as well as superior operation under conditions of accelerated loading, and final operation to high final pressure drop. The preferred ratio of upstream to downstream media spacing is in the range of about 2:1 to 2½:1.

DETAILED DESCRIPTION

Figure 1:
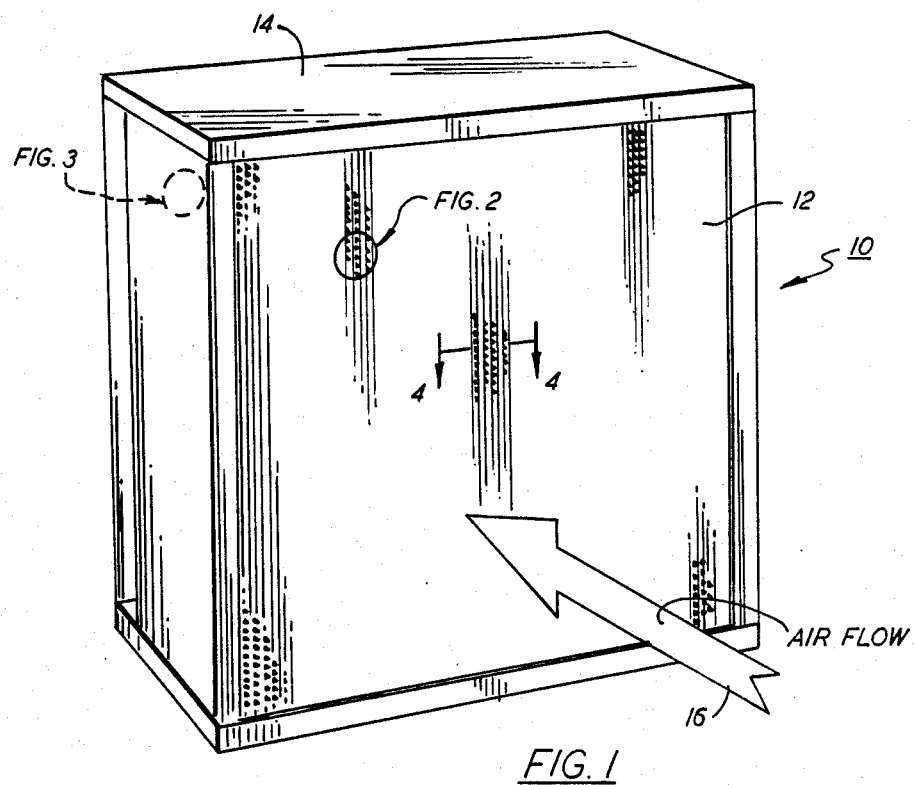
FIG. 1 is a perspective view of a filter pack constructed according to the present invention, shown from the upstream side.

Referring now to the drawings, in FIG. 1 is shown a HEPA-type air filter pack, designated generally by reference numeral 10, having a core 12 of air-permeable media enclosed on four sides by box-like frame 14. The media is in the form of a continuous sheet, folded back and forth in zig-zag fashion to form accordion style pleats, adjacent walls of which are held in spaced relation by corrugated spacers, in a manner well known in the art. Core 12 is sealed to interior surfaces of frame 14 by an epoxy or other suitable sealant, both the materials and techniques used to effect such sealing also being conventional and forming no part of the present invention.

In use, filter pack 10 is mounted in an appropriately configured opening in a wall or other supporting structure (not shown) to which frame 14 is sealed about its periphery, whereby all air passing from one side of the structure to the other must pass through core 12. The filter pack is mounted in the support structue with the side of face of core 12 shown in FIG. 1 facing in the direction of incoming air, as indicated by arrow 16. Thus, the face shown in FIG. 1 is termed the "upstream" side of the filter, and the opposite side through which the filtered air exits, is termed the "downstream" side, in accordance ith conventional terminology in the art.

Figure 2:
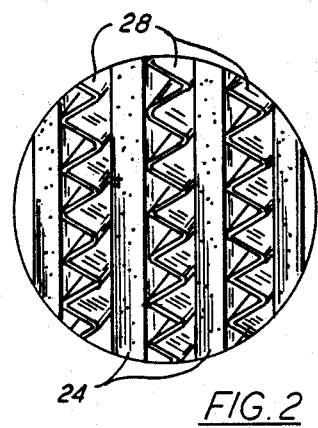
FIG. 2 is an enlarged, perspective view of a small segment of the upstream face of the filter pack of FIG. 1.
Figure 4:
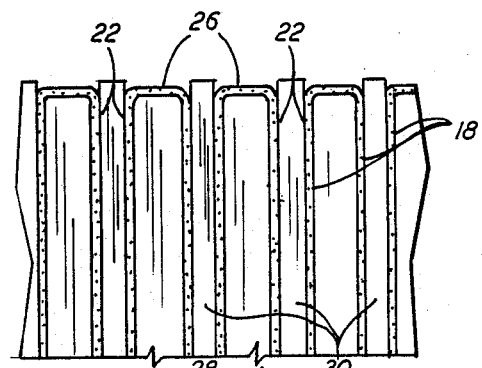
FIG. 4 is a fragmentary, plan view of a portion of the filter pack of FIG. 1, taken generally on the line 4—4 thereof.
Figure 3:
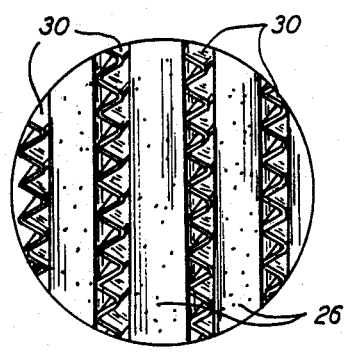
FIG. 3 is a view similar to FIG. 2, taken from the downstream face of the filter pack.

Filter packs having the features described above have been used for many years, both standard HVAC applications and in other filtering applications involving higher dust loading that encountered in the usual HVAC uses. In such prior art filter packs the pleat walls on the upstream and downstream sides are spaced by the same distance. In the present invention, on the other hand, the spacing on the upstream side is at least twice the spacing on the downstream side. As seen in FIG. 2-4, the sheet of filter media is folded to provide a succession of substantially parallel walls 18, each having an upstream surface 20 and a downstream surface 22. The media is folded with the aid of standard pleating bars to provide substantially squared ends, termed pleat knuckles, those on the upstream and downstream sides being respectively denoted by reference numerals 24 and 26.

Each pair of adjacent surfaces 20 of walls 18 is maintained in spaced relation when filter pack 10 is in use by upstream spacers 28. Surfaces 22 are likewise maintained in spaced relatin by downstream spacers 30. Each of spacers 28 and 30 is formed of a sheet of aluminum, or other suitable material, bent in sine wave or V-shaped form to a desired amplitude, as commonly done in the art for some years. Although corrugated spacers having different amplitudes at the two ends, i.e., tapered spacers, have been utilized in some applications, the spacers of the present filter pack are of constant amplitude from end to end.

The distinguishing feature of the present filger pack is the use of upstream spacers 28 having an amplitude between about 2 and 2½ timnes the amplitude of downstream spacers 28. According, pleat knuckles 24 are narrow by an amount substantially corresponding to the difference in amplitude of the spacers 28 and 30 than knuckles 26.

It has been found that a specific range of spacer amplitudes exists for both upstream and downstream areas to achieve the optimum dust holding capacity, as well as to maintain a reasonable cost. The low end amplitude represents the point at which the performance advantage of adding filter media begins to decreases rather than increase. The minimum spacer amplitude which meets the foregoing criteria has been fond to be about 0.080 inches.

Through testing it has also been determined that there is a maximum value of pleat spacing, and of corresponding spacer amplitude, at which performance is degraded due to diminishing media area. This value has been determined to be about 0.500 inches. Furthermore, the best range of ratios between upstream and downstream media surface spacing (spacer amplitude) has been determined to be between 2 to 1 and 2½ to 1. This represents the range providing the best cost-performance relationship; that is, it provides the optimum range to attain minimum cost and maximum dust holding capacity. Although maximum dust holding capacity is never constant due to changes in the nature of the contaminants, filter packs constructed according to the present invention may be expected to hold 2½ to 3½ times the amount of contaminants as a conventional filer pack having equal spacing of the upstream and downstream pleat walls at a final or change-out resistance of 3½ to 5 inches w.g.

This, the filter pack of the invention is constructed with an upstream media spacing no greater than about 0.500 inches, and a downstream media spacing no less than 0.080 inches, and the ratio of upstream to downstream spacing is in the range of 2:1 to 2½:1. An example of dimensions for a successfully constructed and tested filter pack having these attributes is: large amplitude spacers 0.180"; wide pleat knuckles formed using 0.190" wide pleating bar; narrow amplitude spacers 0.080:"; narrow pleat knuckles formed using 0.060" wide pleating bar; filter pack 22½" high, 22½" wide, 10½" deep.

What is claimed is:

1. A HEPA air filter comprising:
   (a) a four sided, box-like frame;
   (b) a continuous sheet of filter media folded back and forth in an accordion fashion to provide a plurality of pleats formed by substantially parallel, spaced walls of media with zig-zag edges on two opposite sides in parallel planes and terminating media walls on two other opposite sides in parallel planes;
   (c) means sealing said zig-zag edges and said terminating walls to inner surfaces of said frame for flow of air into the pleates facing in an upstream direction of air flow, through the media, and out of the pleats facing in the downstream direction;
   (d) upstream corrugated spacers having a length and width corresponding substantially to the length and width of said media walls and a first, constant amplitude, one of said upstream spacers being placed between the opposing walls of each of said pleats facing in the upstream direction; and
   (e) downstream corrugated spacers having a length and width corresponding substantially to the length and width of said media walls and a second, constant amplitude, one of said downstream spacers being placed between the opposing walls of each of said pleats facing in said downstream direction;
   (f) said first amplitude being in the range of 2 to 2½ times said second amplitude, whereby the walls of said upstream pleats are spaced from one another by a distance 2 to 2½ times greater than the distance by which the walls of said downstream pleats are spaced from one another.

2. The air filter of claim 1 wherein said first amplitude is not greater than about 0.500".

3. The air filter of claim 2 wherein said second amplitude is not less than about 0.080".

4. The air filter of claim 1 wherein said first amplitude is about 0.180"and said second amplitude is about 0.080".

5. The air filter of claim 4 wherein said pleats are at least 10 inches deep.

* * * * *